US012690093B2

(12) United States Patent
Sun et al.

(10) Patent No.: US 12,690,093 B2
(45) Date of Patent: Jul. 21, 2026

(54) SSB ENHANCEMENT FOR NR CDRX AND DRX OPERATION

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Hongbo Yan, Vista, CA (US); Huaning Niu, San Jose, CA (US); Oghenekome Oteri, San Diego, CA (US); Seyed Ali Akbar Fakoorian, San Diego, CA (US); Shengshan Cui, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 18/247,339

(22) PCT Filed: Oct. 2, 2020

(86) PCT No.: PCT/CN2020/119794
§ 371 (c)(1),
(2) Date: Mar. 30, 2023

(87) PCT Pub. No.: WO2022/067860
PCT Pub. Date: Apr. 7, 2022

(65) Prior Publication Data
US 2024/0008140 A1     Jan. 4, 2024

(51) Int. Cl.
*H04W 76/28*     (2018.01)
*H04L 5/00*     (2006.01)

(52) U.S. Cl.
CPC ........... *H04W 76/28* (2018.02); *H04L 5/0023* (2013.01); *H04L 5/0035* (2013.01); *H04L 5/0048* (2013.01)

(58) Field of Classification Search
CPC ... H04L 5/0023; H04L 5/0035; H04L 5/0048; H04W 76/28
See application file for complete search history.

(56) References Cited

U.S. PATENT DOCUMENTS

2020/0112498 A1 *   4/2020   Manolakos ......... H04J 13/0062
2020/0314665 A1     10/2020   Cheng et al.
(Continued)

FOREIGN PATENT DOCUMENTS

CN         111557081         8/2020
WO       2019/053630         3/2019
(Continued)

OTHER PUBLICATIONS

Intel Corporation et al., "Release-16 UE capabilities based on RAN1, RAN4 feature lists and RAN2 corrections", 3GPP TSG RAN WG2 Meeting #111e, Aug. 17-28, 2020, R2-2008638, 100 sheets.
(Continued)

*Primary Examiner* — Brian P Cox
(74) *Attorney, Agent, or Firm* — Fay Kaplun & Marcin, LLP

(57) ABSTRACT

A user equipment (UE) is configured to receive synchronization signal blocks (SSBs) from a wireless network to estimate frequency and timing errors. The UE receives a quasi co-location (QCL) configuration between a synchronization signal block (SSB) and at least one of a further SSB or a tracking reference signal (TRS), receives the SSB and the at least one of the further SSB or the TRS and estimates a frequency and timing error for the SSB by combining,
(Continued)

Method 600

Start gNB determines a QCL relationship for SSB and one or more further SSB and/or a TRS — 605 gNB configures UE with determined QCL relationships — 610 gNB transmits to the UE the SSBs and/or the TRS(s) — 615

UE determines a frequency and timing error estimate for each of received signals and combines the estimates for the signals having a defined QCL relationship — 620

End based on the QCL configuration, measurements for the SSB and measurements for the at least one of the further SSB or the TRS.

15 Claims, 6 Drawing Sheets

(56)                    References Cited

U.S. PATENT DOCUMENTS

| | | | |
|---|---|---|---|
| 2021/0176687 A1 | 6/2021 | Ko et al. | |
| 2021/0345201 A1* | 11/2021 | Cheng | H04W 24/10 |
| 2023/0139558 A1* | 5/2023 | Liu | H04L 5/005 |
| | | | 370/329 |
| 2023/0308241 A1* | 9/2023 | Liu | H04L 5/0051 |

FOREIGN PATENT DOCUMENTS

| | | |
|---|---|---|
| WO | 2019/097356 | 5/2019 |
| WO | 2020/063808 | 4/2020 |

OTHER PUBLICATIONS

Nokia et al.: "Discussion on RLM in NR-U", 3GPP TSG-RAN WG4 Meeting #93, R4-1914176, Aug. 8, 2019, 7 sheets.
Fujitsu: "RA procedure considering SSBs with QCL relationship", 3GPP TSG-RAN WG2 Meeting #109 electronic, R2-2000771, Feb. 14, 2020, 3 sheets.
Ericsson, "Additional synchronization provision", 3GPP TSG RAN WG1 Meeting #90bis, Oct. 13, 2017, 11 sheets.

* cited by examiner

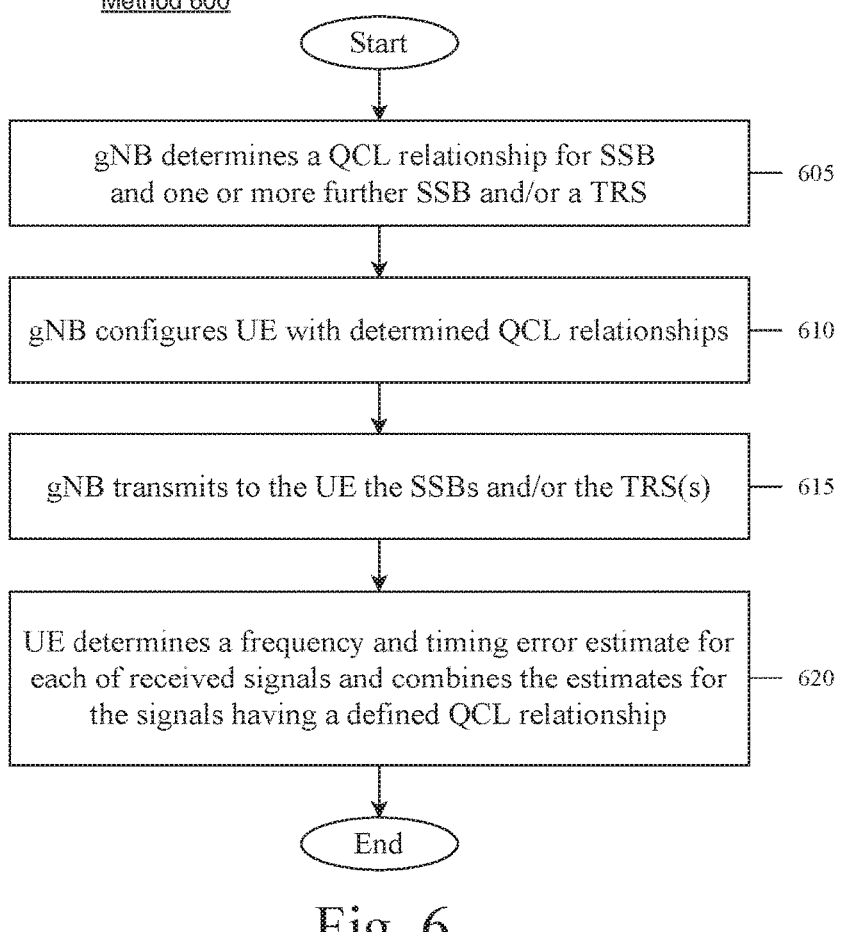

Method 600

Start gNB determines a QCL relationship for SSB
and one or more further SSB and/or a TRS — 605 gNB configures UE with determined QCL relationships — 610 gNB transmits to the UE the SSBs and/or the TRS(s) — 615

UE determines a frequency and timing error estimate for
each of received signals and combines the estimates for — 620
the signals having a defined QCL relationship End

Fig. 6

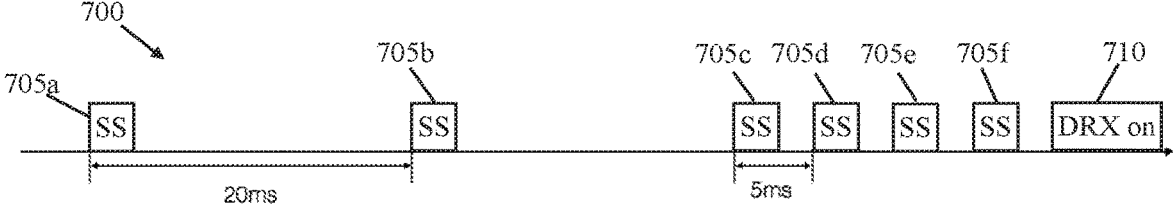

700

705b        705c  705d  705e  705f    710

705a

SS        SS        SS  SS  SS  SS  DRX on

|←————— 20ms —————→|            |← 5ms →|        t

Fig. 7

SSB ENHANCEMENT FOR NR CDRX AND DRX OPERATION

TECHNICAL FIELD

This application relates generally to wireless communication systems, and in particular relates to SSB enhancement for NR CDRX and DRX operation.

BACKGROUND INFORMATION

In NR, discontinuous reception (DRX) and connected mode DRX (CRDX) operation is supported for user equipment (UE) power saving. When a UE sleeps for a long duration during DRX or CDRX operation, the UE may have a large frequency and timing error upon waking up. The large frequency and timing offset may impact the UE decoding of downlink control information (DCI) and physical downlink shared channel (PDSCH). Further, the 'always on' signal used in LTE, e.g. the cell-specific reference signal (CRS), is removed in NR, introducing further challenges for the UE to acquire timing and frequency estimation.

SUMMARY

Some exemplary embodiments are related to one or more processors configured to perform operations. The operations include receiving a quasi co-location (QCL) configuration between a synchronization signal block (SSB) and at least one of a further SSB or a tracking reference signal (TRS), receiving the SSB and the at least one of the further SSB or the TRS and estimating a frequency and timing error for the SSB by combining, based on the QCL configuration, measurements for the SSB and measurements for the at least one of the further SSB or the TRS.

Other exemplary embodiments are related to a user equipment (UE) having a transceiver configured to connect to a base station and one or more processors communicatively coupled to the transceiver and configured to perform operations. The operations include receiving a quasi co-location (QCL) configuration between a synchronization signal block (SSB) and at least one of a further SSB or a tracking reference signal (TRS), receiving the SSB and the at least one of the further SSB or the TRS and estimating a frequency and timing error for the SSB by combining, based on the QCL configuration, measurements for the SSB and measurements for the at least one of the further SSB or the TRS.

Still further exemplary embodiments are related to one or more processors configured to perform operations. The operations include receiving synchronization signal blocks (SSBs) transmitted with a first periodicity when one of a discontinuous reception (DRX) wake up or a connected DRX (CDRX) wake up is greater than a predetermined duration away, receiving SSBs transmitted with a second periodicity more frequent than the first periodicity when the DRX wake up or CDRX wakeup is within the predetermined duration away and estimating a frequency and timing error for the SSBs by combining measurements for the received SSBs.

BRIEF DESCRIPTION OF THE DRAWINGS

FIG. 6 shows a method for performing UE synchronization comprising a QCL relationship for a synchronization signal block (SSB) and a further SSB and/or a tracking reference signal (TRS) according to various exemplary embodiments.

FIG. 7 shows an SSB timing diagram for non-uniform SSB periodicity according to various exemplary embodiments.

DETAILED DESCRIPTION

Figure 1:
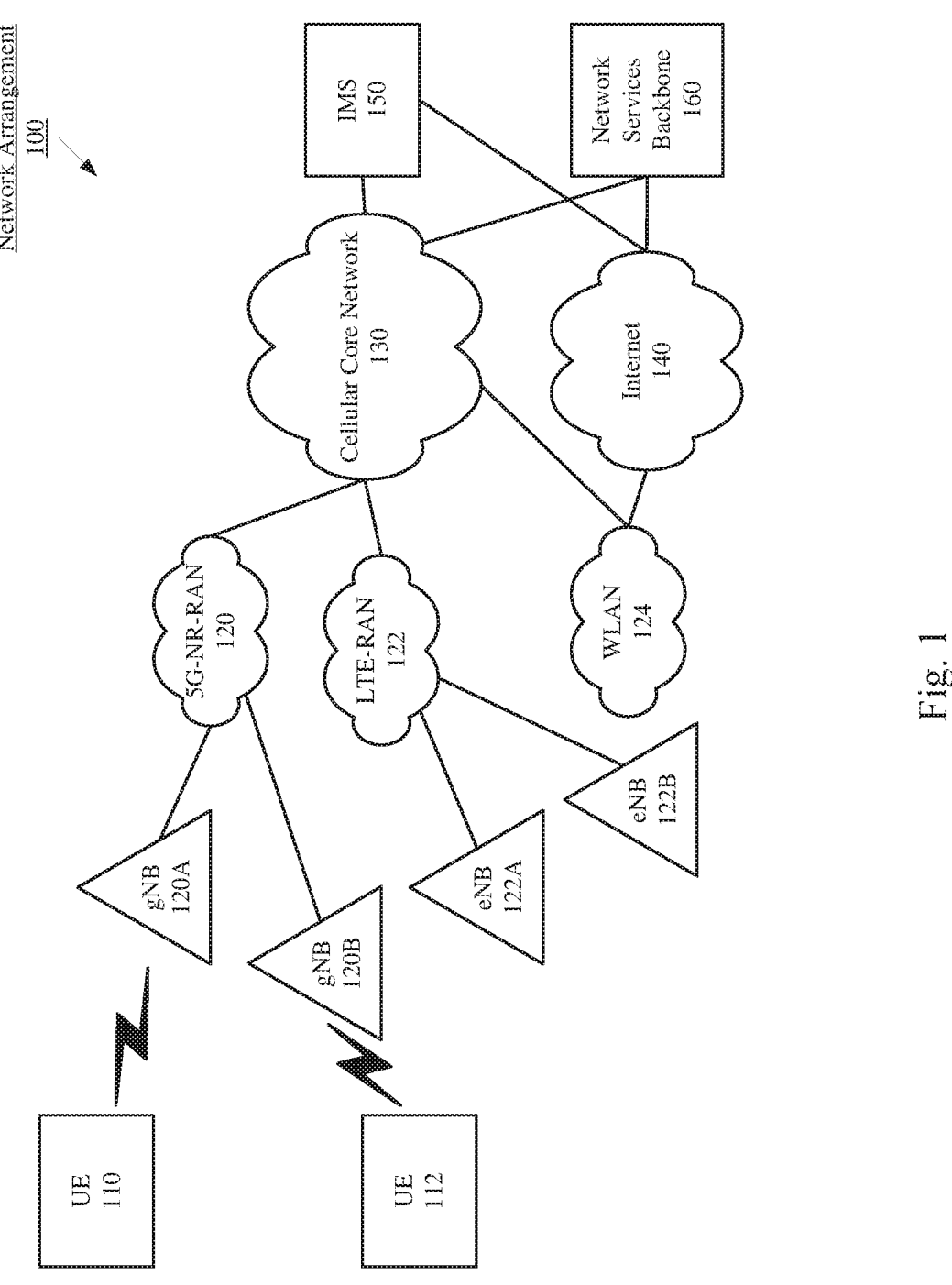
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe quasi co-location (QCL) configurations between different synchronization signal blocks (SSBs) and between tracking reference signals (TRS) and SSBs so that a user equipment (UE) may better estimate a frequency and timing offset of a received signal. In further exemplary embodiments, a non-uniform SSB periodicity is supported.

Timing and carrier synchronization is essential to the proper functioning of a wireless communication system. Timing synchronization is the process by which a receiver node determines the correct instants of time at which to sample the incoming signal. Carrier synchronization is the process by which a receiver adapts the frequency and phase of its local carrier oscillator with those of the received signal. A UE can use the primary and secondary synchronization signals (PSS and SSS) in an SSB to achieve synchronization in the downlink.

According to the exemplary embodiments described herein, a UE may quickly update its timing and frequency error estimation to achieve synchronization with a network cell, e.g. a next generation NodeB (gNB) in a New Radio (NR) communication system. A quick synchronization allows the UE to conserve power and more effectively decode downlink control information (DCI) and physical downlink shared channel (PDSCH).

Network/Devices

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
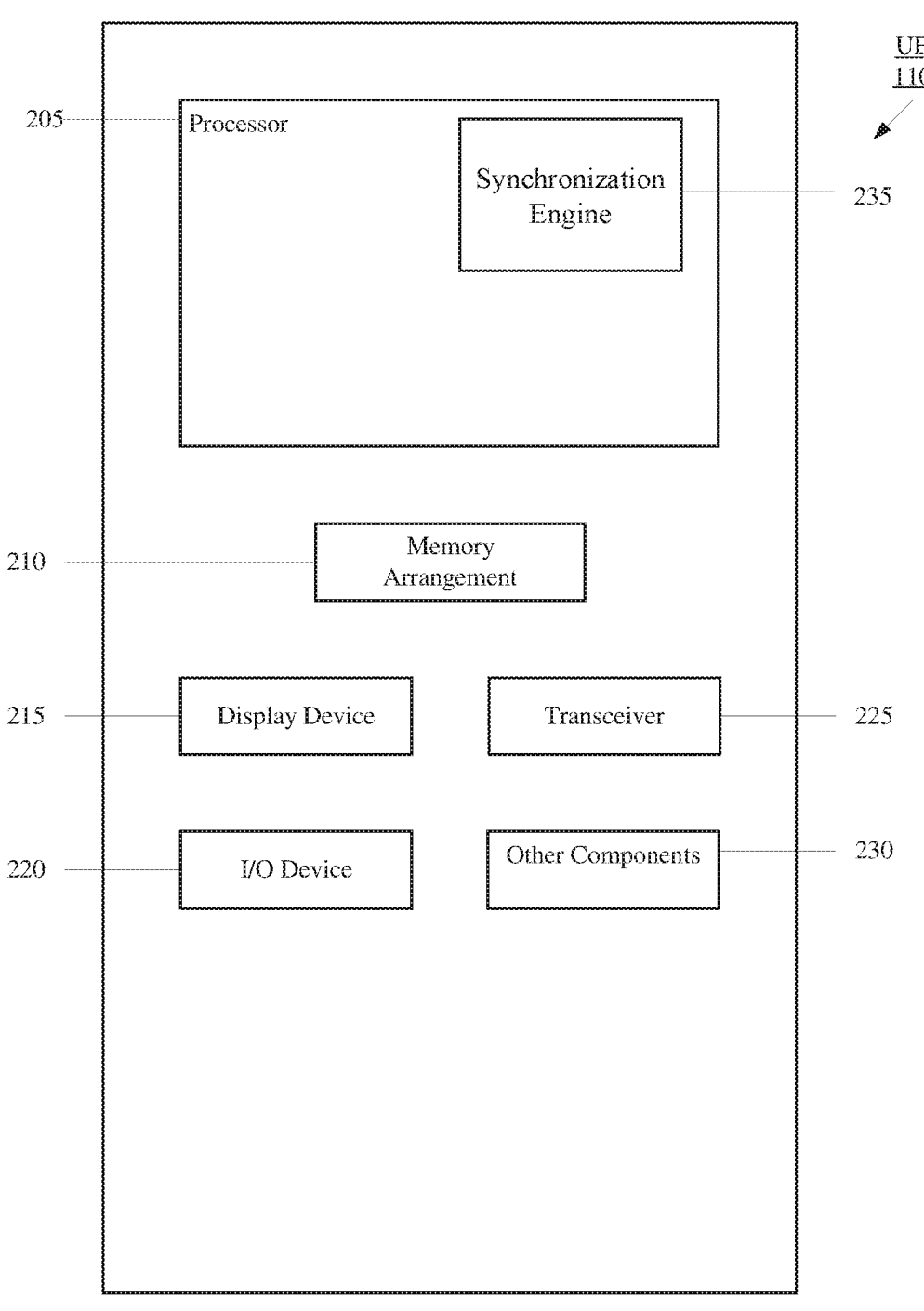
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a synchronization engine 235 for synchronizing a frequency and timing error offset for a network connection. The synchronization engine 235 may perform operations such as receiving a QCL relationship between SSBs and/or between an SSB and a TRS and estimating a frequency and timing error offset by combining estimations from the various signals, to be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g. NR-U is configured.

Figure 3:
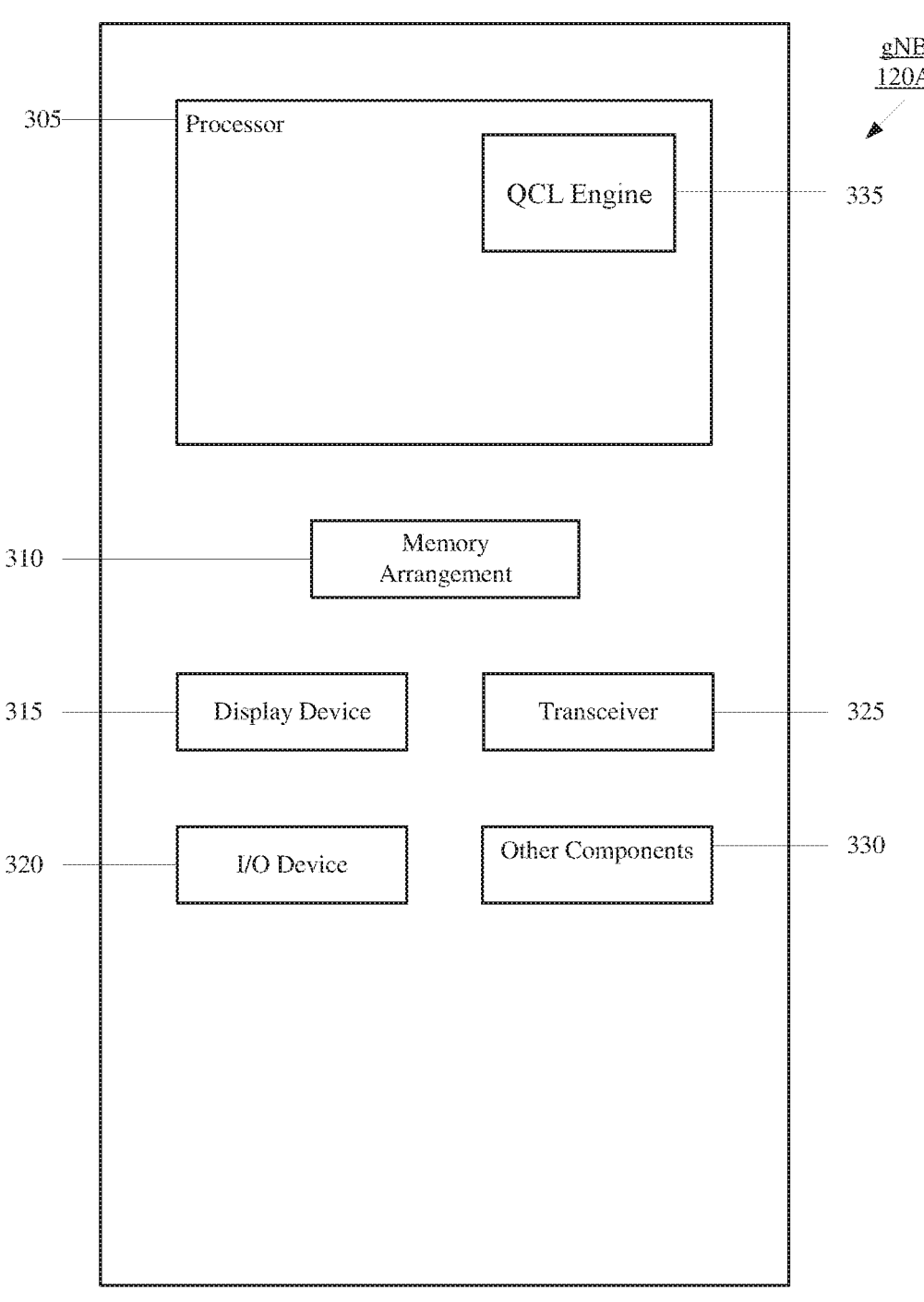
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a QCL engine 235 for performing operations including determining a QCL relationship between SSBs and/or between an SSB and a TRS and configuring a UE with the QCL relationship, to be described in detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the network arrangement 100. The transceiver 325 may operate on a variety of different frequencies or channels (e.g., set of consecutive frequencies). For example, the transceiver 325 may operate on unlicensed bandwidths when NR-U functionality is configured. Therefore, the transceiver 325 may include one or more components (e.g., radios) to enable the data exchange with the various networks and UEs.

DRX and CDRX for NR

In NR, discontinuous reception (DRX) and connected mode DRX (CDRX) operation is supported for user equipment (UE) power saving. CDRX operation is supported for a UE in RRC connected mode and comprises an On Duration in which the UE monitors the PDCCH for data scheduling. DRX operation is supported for a UE in RRC Idle mode and comprises an On Duration in which the UE monitors for downlink control information (DCI) during paging opportunities.

In NR, when a UE sleeps for a long duration during DRX or CDRX operation, the UE may have a large frequency and timing error upon waking up (entering its On Duration). The large frequency and timing offset may impact the UE decoding of DCI and PDSCH. Further, the 'always on' signal used in LTE, e.g. the cell-specific reference signal (CRS), is removed in NR, introducing further challenges for the UE to acquire timing and frequency estimation.

A tracking reference signal (TRS) is introduced in NR to assist the UE in frequency and timing estimation. The TRS design is similar to the CRS design, however, the TRS cannot be configured in RRC idle mode. Before CDRX/DRX wakeup, to prepare the DCI and PDSCH demodulation, the UE may need to perform pre-processing for frequency and timing tracking. If there is no dense RS configured before CDRX/DRX wake up it can lead to a significant increase in UE power consumption.

SSB Timing Frequency QCL Enhancement

According to various exemplary embodiments described herein, a further QCL type is introduced between different synchronization signal blocks (SSB) to define situations where the timing and frequency error estimated from different SSBs are similar. This allows a UE to safely combine the timing and frequency error estimates from multiple SSBs to improve the estimation accuracy. The SSB comprises a primary synchronization signal (PSS), a secondary synchronization signal (SSS), a physical broadcast channel (PBCH) demodulation reference signal (DMRS) and PBCH data transmitted via a specific beam radiated in a certain direction.

Existing Quasi Co-Location (QCL) types defined in 3GPP TS 38.214 include QCL-TypeA, QCL-TypeB, QCL-TypeC and QCL-TypeD. QCL-TypeA relates to Doppler shift, Doppler spread, average delay and delay spread. QCL-TypeB relates to Doppler shift and Doppler spread. QCL-TypeC relates to Doppler shift and average delay. QCL-TypeD relates to spatial Rx parameters.

Figure 4A:
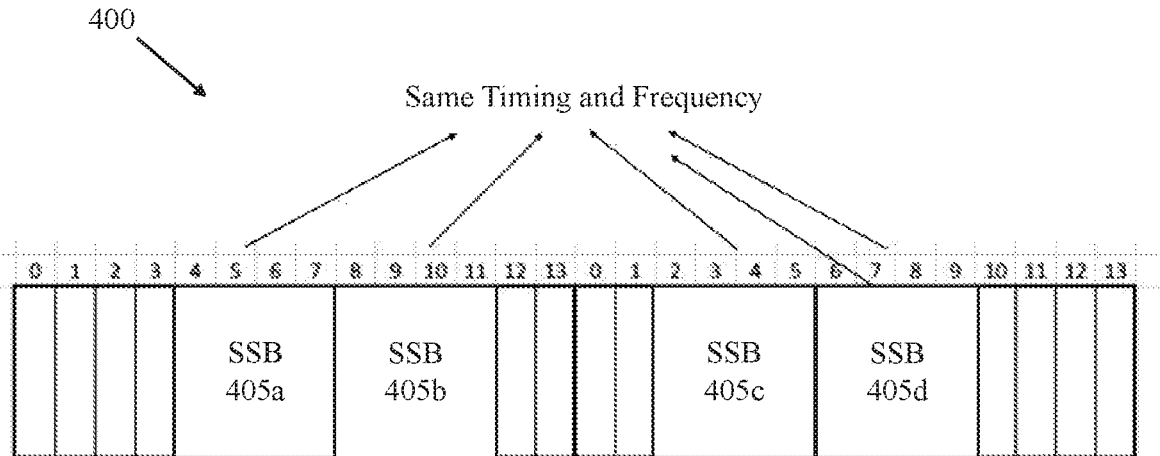
FIG. 4a shows a slot diagram comprising four SSBs having a QCL-TypeX configuration according to various exemplary embodiments.

According to various exemplary embodiments described herein, a new QCL type is defined for a timing and frequency relationship between different reference signals, referred to herein as QCL-TypeX. SSBs defined with a QCL-TypeX relationship are assumed to share a same timing and frequency error and are grouped together. Thus, a UE may combine measurements for the SSBs in an SSB group to better determine a timing and frequency error for the SSBs in the group. FIG. 4a shows a slot diagram 400 comprising four SSBs 405a-d having a QCL-TypeX configuration according to various exemplary embodiments. Thus, the frequency and timing error estimations for each of the SSBs 405a-d may be shared.

Figure 4B:
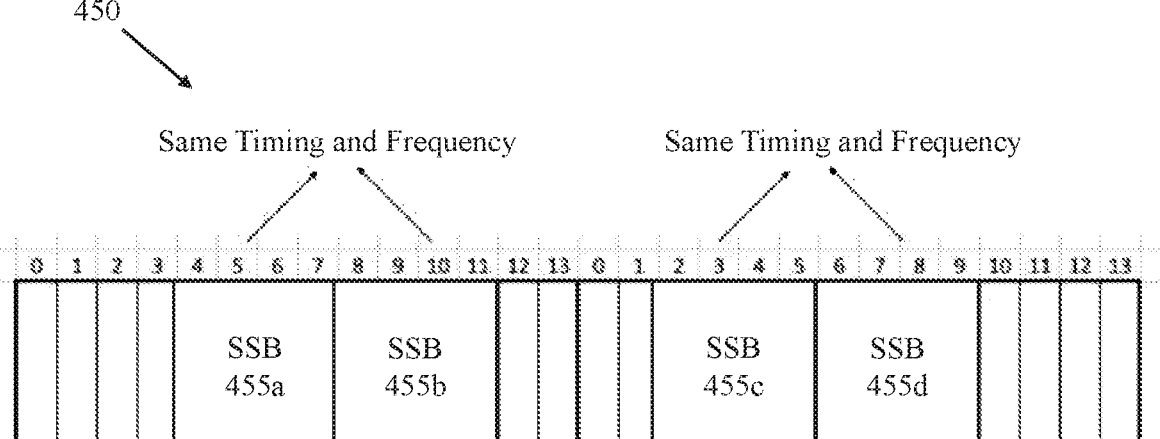
FIG. 4b shows a slot diagram comprising four SSBs in which a first pair of SSBs have a QCL-TypeX configuration, and a second pair of SSBs have a QCL-TypeX configuration according to various exemplary embodiments.

Different groups of SSBs may share different timing and frequency errors. For example, one group may be transmitted from a different antenna panel than another group and have a different frequency error. In another example, one group may be transmitted from a different transmit and reception point (TRP) than another group and have an even larger difference in timing and frequency error. FIG. 4b shows a slot diagram 450 comprising four SSBs 455a-d in which SSBs 455a and 455b have a QCL-TypeX configuration, and SSBs 455c and 455b have a QCL-TypeX configuration. Thus, the frequency and timing error estimations for SSBs 405a-b may be shared, and the frequency and timing error estimations for SSBs 405c-d may be shared.

The QCL configuration between different SSBs can be configured for the UE in system information, e.g. a system information block (SIB), and, in some embodiments, can be used for a UE in either the RRC idle, RRC inactive or RRC connected state, e.g. for DRX or CDRX. The QCL configuration may also be configured via RRC configuration after an RRC connection is established, in which case the UE is in the RRC connected state and the QCL configuration can be used for CDRX.

For each SSB, a QCL-TypeX reference signal (RS) can be configured. The QCL-TypeX reference signal source may be an SSB. When a QCL-TypeX reference signal source is not configured for an SSB, the SSB may only be QCL-TypeX to itself, and the SSB that has itself as the QCL-TypeX source.

The SSB timing and frequency QCL configuration may be configured in the various manners. For example, among a total N SSBs, M segments of SSB may be configured, each segment having K SSBs (N=M*K). In a first example, for each of the consecutive K SSBs in the same segment, the SSBs may be grouped to share the same timing and frequency errors. The N total SSBs are segmented into M segments of SSB, each having consecutive K SSBs. For example, when M=2 and K=4 (N=8 SSBs), the SSB configuration for the 8 SSBs may be (T/F1, T/F1, T/F1, T/F1, T/F2, T/F2, T/F2, T/F2).

In a second example, among every consecutive M SSBs, each SSB has different timing and frequency error assumptions. For every M SSBs, the SSBs share the same timing and frequency error when they are M SSB apart. For example, when M=2 and K=4 (N=8 SSBs), the SSB configuration for the 8 SSBs may be (T/F1, T/F2, T/F1, T/F2, T/F1, T/F2, T/F1, T/F2).

According to further exemplary embodiments, a TRS may be configured as QCL to an SSB. In the current standards, an aperiodic TRS (AP-TRS) may be configured as QCL only to a periodic TRS (P-TRS). In one exemplary embodiment, an AP-TRS can be configured as QCL to an SSB. In another exemplary embodiment, a P-TRS and a semi-persistent TRS (SP-TRS) can be configured as QCL to an SSB. SSBs are typically transmitted periodically with a duration of 20 ms, while TRS may be transmitted with smaller or larger periodicity. Thus, using a QCL relationship between the TRS and SSB may allow a UE to perform a faster synchronization with a TRP.

Figures 5A, 5B, 5C:
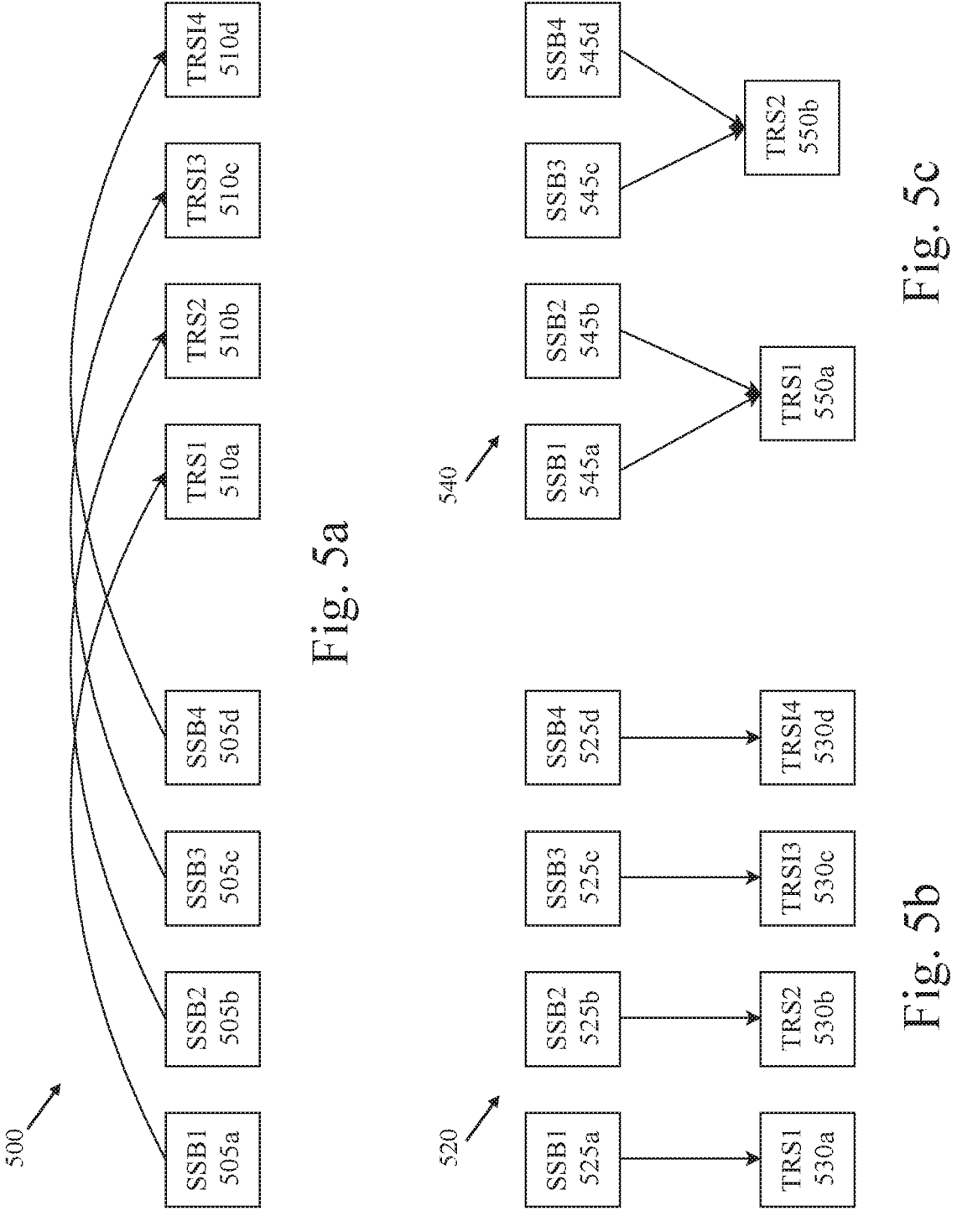
FIG. 5a shows an exemplary mapping diagram of a QCL relationship between SSBs and TRSs according to various exemplary embodiments.
FIG. 5b shows an exemplary one-to-one mapping diagram of a QCL relationship between SSBs and TRSs according to various exemplary embodiments.
FIG. 5c shows an exemplary one-to-many mapping diagram of a QCL relationship between SSBs and TRSs according to various exemplary embodiments.

FIG. 5a shows an exemplary mapping diagram 500 of a QCL relationship between SSBs and TRSs. In this example, the TRS1 510a is QCL to the SSB1 505a, the TRS2 510b is QCL to the SSB2 505b, the TRS3 510c is QCL to the SSB3 505c and the TRS4 510d is QCL to the SSB4 505d. When the UE performs frequency and timing error estimation for an SSB, the measurements for the QCL TRS may also be used.

The QCL mapping between the TRS and the SSB may be one-to-one. FIG. 5b shows an exemplary one-to-one mapping diagram 520, similar to the diagram 500 discussed above. In this example, one TRS may be QCL to one unique SSB, e.g. the TRS1 530a is QCL to the SSB1 525a, the TRS2 530b is QCL to the SSB2 525b, the TRS3 530c is QCL to the SSB3 525c and the TRS4 530d is QCL to the SSB4 525d. To reduce TRS overhead, the QCL mapping between the TRS and SSB can be one-to-many. FIG. 5c shows an exemplary one-to-many mapping diagram 540. In the one-to-many configuration, one TRS may be QCL to more than one SSB, e.g. the TRS1 550a is QCL to the SSB1 545a and SSB2 545b and the TRS2 550b is QCL to the SSB3 545c and SSB4 545d.

FIG. 6 shows a method 600 for performing UE synchronization comprising a QCL relationship for a synchronization signal block (SSB) and a further SSB and/or a tracking reference signal (TRS). In 605, a gNB determines a QCL relationship for the SSB and one or more further SSB and/or a TRS. For example, as described above, multiple SSB having a same TRP may be grouped together and share a QCL relationship. Additionally, a TRS may be associated with one or more SSB and share the QCL relationship.

In 610, the gNB configures the UE with the determined QCL relationships. For example, as described above, the gNB may configure the QCL relationship via an SIB or RRC signaling. In 615, the gNB transmits to the UE the SSBs and, in some embodiments, the TRS(s).

In 620, the UE determines a frequency and timing error estimate for each of the received signals and combines the estimates for the signals having a defined QCL relationship. Thus, the UE may synchronize with the various TRPs more quickly and accurately by using the combined measurements from the multiple signals having the QCL relationship.

According to a further exemplary embodiment, non-uniform SSB periodicity is supported for enhanced DRX idle mode operation. As discussed above, a typical SSB periodicity may be 20 ms. When a UE is not close to the DRX wake up, e.g. is some minimum duration away from wake up, this nominal SSB periodicity can be assumed by the UE, e.g. every 20 ms. However, when the UE is close to the DRX wake up, e.g. is within the minimum duration away from wake up, a more frequent SSB can be assumed by the UE, e.g. every 5 ms.

FIG. 7 shows an SSB timing diagram 700 for non-uniform SSB periodicity. Synchronization signals 705a, 705b and 705c are transmitted with the nominal SSB periodicity, e.g. 20 ms between transmissions. When the UE is close to waking up, the SSB periodicity may be more frequent, e.g. 5 ms. Thus, synchronization signals 705d, 705e and 705f are transmitted with a shorter periodicity until the DRX wake up 710.

The transition between nominal and more frequent SSB periodicity may be defined based on a window before DRX wake up. The window may be a time duration of X ms. In the example of FIG. 7, if a time duration is used, the window within which the periodicity is more frequent is 20 ms. In another embodiment, the window may be based on a number of SSBs (with a nominal periodicity). In the example of FIG. 7, if an SSB-defined window is used, the window may be based on the last SSB to be transmitted with a nominal periodicity. After this SSB is transmitted, the periodicity may be changed to the more frequent periodicity.

EXAMPLES

In a first example, one or more processors are configured to perform operations comprising configuring, for a user equipment (UE), a quasi co-location (QCL) configuration between a synchronization signal block (SSB) and at least one of a further SSB or a tracking reference signal (TRS), and transmitting the SSB and the at least one of the further SSB or the TRS, wherein the UE estimates a frequency and timing error for the SSB by combining measurements for the SSB and measurements for the at least one of the further SSB or the TRS.

In a second example, the one or more processors of first example, wherein the SSB and the at least one of the further SSB or the TRS are transmitted from a same transmit and reception point (TRP).

In a third example, the one or more processors of first example, wherein the QCL configuration comprises a grouping of SSBs.

In a fourth example, the one or more processors of third example, wherein the QCL configuration is transmitted in a system information block (SIB) or via radio resource control (RRC) signaling.

In a fifth example, the one or more processors of third example, wherein a QCL reference signal source is the SSB.

In a sixth example, the one or more processors of third example, wherein consecutive SSBs share the QCL configuration.

In a seventh example, the one or more processors of third example, wherein every M SSBs share the QCL configuration.

In an eighth example, the one or more processors of first example, wherein the QCL configuration comprises the TRS and one or more SSBs.

In a ninth example, the one or more processors of eighth example, wherein one TRS is mapped to one SSB.

In a tenth example, the one or more processors of eighth example, wherein one TRS is mapped to more than one SSB.

In an eleventh example, a base station comprises a transceiver configured to connect to a user equipment (UE) and one or more processors configured to perform operations comprising configuring, for the UE, a quasi co-location (QCL) configuration between a synchronization signal block (SSB) and at least one of a further SSB or a tracking reference signal (TRS), and transmitting the SSB and the at least one of the further SSB or the TRS, wherein the UE estimates a frequency and timing error for the SSB by combining measurements for the SSB and measurements for the at least one of the further SSB or the TRS.

In a twelfth example, the base station of the eleventh example, wherein the SSB and the at least one of the further SSB or the TRS are transmitted from a same transmit and reception point (TRP).

In a thirteenth example, the base station of the eleventh example, wherein the QCL configuration comprises a grouping of SSBs.

In a fourteenth example, the base station of the thirteenth example, wherein the QCL configuration is transmitted in a system information block (SIB) or via radio resource control (RRC) signaling.

In a fifteenth example, the base station of the thirteenth example, wherein a QCL reference signal source is the SSB.

In a sixteenth example, the base station of the thirteenth example, wherein consecutive SSBs share the QCL configuration or every M SSBs share the QCL configuration.

In a seventeenth example, the base station of the eleventh example, wherein the QCL configuration comprises the TRS and one or more SSBs, wherein one TRS is mapped to one SSB or one TRS is mapped to more than one SSB.

In an eighteenth example, one or more processors are configured to perform operations comprising transmitting synchronization signal blocks (SSBs) with a first periodicity when a discontinuous reception (DRX) wake up or a connected DRX (CDRX) wake up for a user equipment (UE) is greater than a predetermined duration away, and transmitting SSBs with a second periodicity more frequent than the first periodicity when the DRX wake up or the CDRX wake up is within the predetermined duration away, wherein the UE estimates a frequency and timing error for the SSBs by combining measurements for the received SSBs.

In a nineteenth example, the one or more processors of the eighteenth example, wherein the predetermined duration is a time duration.

In a twentieth example, the one or more processors of the eighteenth example, wherein the predetermined duration is based on a number of SSBs.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. One or more processors configured to perform operations comprising:
   receiving a system information block (SIB) indicating a quasi co-location (QCL) configuration between a synchronization signal block (SSB) and a tracking reference signal (TRS);
   receiving the SSB and the TRS; and
   estimating a frequency and timing error for the SSB.

2. The one or more processors of claim 1, wherein the SSB and the TRS are transmitted from a same transmit and reception point (TRP).

3. The one or more processors of claim 1, wherein the QCL configuration comprises a grouping of SSBs.

4. The one or more processors of claim 3, wherein a QCL reference signal source is the SSB.

5. The one or more processors of claim 3, wherein consecutive SSBs share the QCL configuration.

6. The one or more processors of claim 3, wherein every M SSBs share the QCL configuration.

7. The one or more processors of claim 1, wherein the QCL configuration comprises the TRS and one or more SSBs.

8. The one or more processors of claim 7, wherein one TRS is mapped to one SSB.

9. The one or more processors of claim 7, wherein one TRS is mapped to more than one SSB.

10. A user equipment (UE), comprising:
   a transceiver configured to connect to a base station; and
   one or more processors communicatively coupled to the transceiver and configured to perform operations comprising:
      receiving a system information block (SIB) indicating a quasi co-location (QCL) configuration between a synchronization signal block (SSB) and a tracking reference signal (TRS);
      receiving the SSB and the TRS; and
      estimating a frequency and timing error for the SSB.

11. The UE of claim 10, wherein the SSB and the TRS are transmitted from a same transmit and reception point (TRP).

12. The UE of claim 10, wherein the QCL configuration comprises a grouping of SSBs.

13. The UE of claim 12, wherein a QCL reference signal source is the SSB.

14. The UE of claim 12, wherein consecutive SSBs share the QCL configuration or every M SSBs share the QCL configuration.

15. The UE of claim 10, wherein the QCL configuration comprises the TRS and one or more SSBs, wherein one TRS is mapped to one SSB or one TRS is mapped to more than one SSB.

\* \* \* \* \*

12